O. H. ROSENBERG.
GROUND MULSHING AND INSECT DISPLACING DRAG.
APPLICATION FILED JAN. 19, 1920.
1,357,905. Patented Nov. 2, 1920.
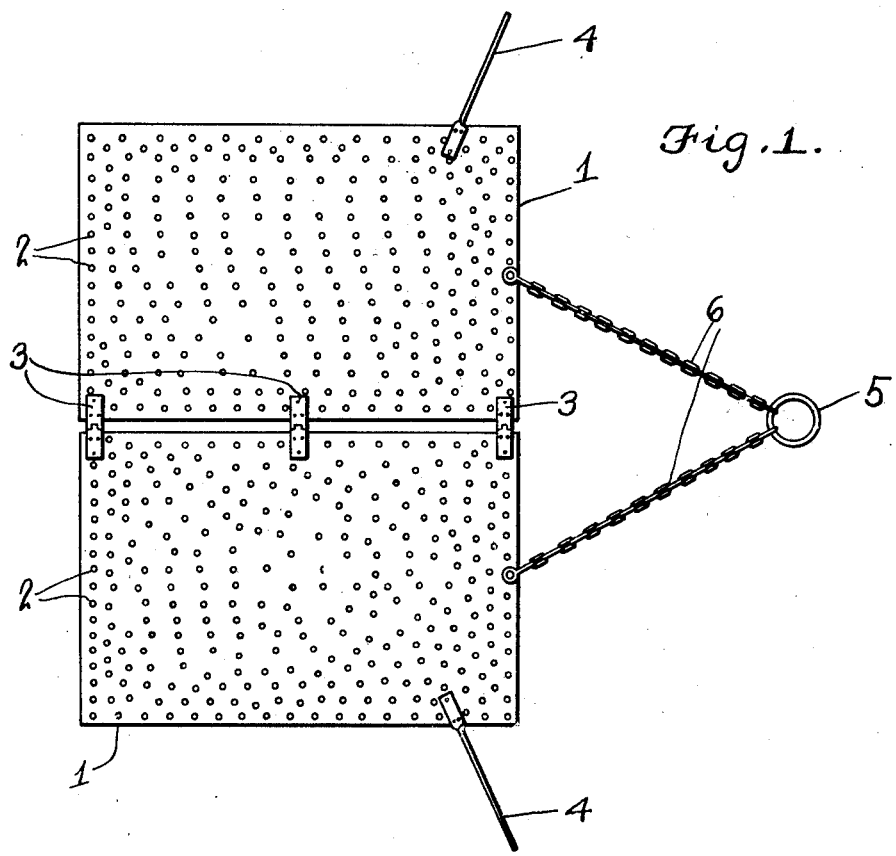
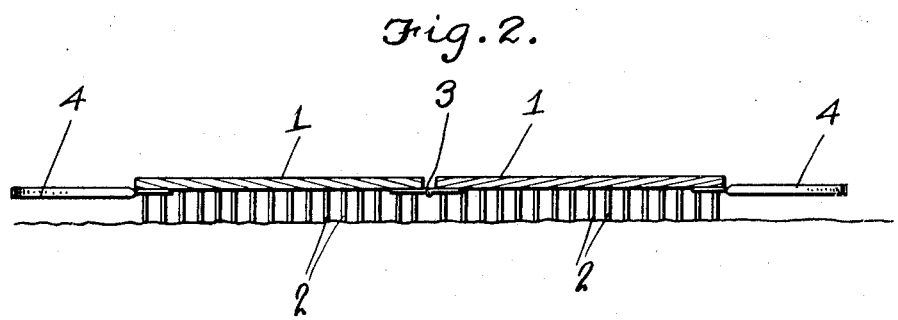
O. H. Rosenberg, Inventor
Witnesses
Lo. B. James
By Victor J. Evans
Attorney

UNITED STATES PATENT OFFICE.

OLIVER H. ROSENBERG, OF TERRELL, TEXAS.

GROUND-MULSHING AND INSECT-DISPLACING DRAG.

1,357,905. Specification of Letters Patent. Patented Nov. 2, 1920.

Application filed January 19, 1920. Serial No. 352,332.

*To all whom it may concern:*

Be it known that I, OLIVER H. ROSENBERG, a citizen of the United States, residing at Terrell, in the county of Kaufman and State of Texas, have invented new and useful Improvements in Ground-Mulshing and Insect-Displacing Drags, of which the following is a specification.

The object of my present invention is the provision of an extremely simple and inexpensive ground-mulshing drag and insect destroyer.

To the attainment of the foregoing, the invention consists in the improvement as hereinafter described and definitely claimed.

In the accompanying drawings, hereby made a part hereof:

Figure 1 is an inverted plan view of my novel drag.

Fig. 2 is a transverse section showing the body members of the drag in proper working position, and also showing the arrangement relatively to the said body members of the lateral springs for striking cotton plants and displacing boll weevils and other insects therefrom.

Similar numerals of reference designate corresponding parts in both views of the drawings.

The major portion of my novel drag is formed by two body members 1, preferably, though not necessarily, of wood. Each of these body members 1 is provided at its under side with pendant spikes 2, which are scattered throughout the area of the member and are preferably about one inch long and arranged about four inches apart. The said body members 1 are connected together through the medium of longitudinal central hinges 3, so that the body members 1 will be drawn along as a unit, and yet will be enabled to accommodate themselves to the irregularities of the ground encountered. Carried by and extending laterally outward from each body member 1 is a spring 4, the function of which is to strike cotton plants in passing and displace insects from the same, so that the insects will fall in the path of the members 1 and be destroyed by the same. At 5 is a ring designed to fit over the rear foot-piece of a cultivator, and at 6 are chains through the medium of which the said ring 5 is connected with the forward ends of the body members 1.

I contemplate in practice employing two drags such as described, on one cultivator, and the drawing of the said drags between rows of cotton. I also contemplate the use of bags of sand on the body members 1 to lend the desired weight to the drags.

Incidental to the use of drags of my invention in the manner described, it will be manifest that they will effectively mulsh the ground, and that during the said mulshing of the ground by the teeth 2, the springs 4 will by jarring the plants, bring about displacement of insects from the plants in such manner that the insects will fall in the paths of the body members 1, and will be destroyed by the same.

The springs 4 may be in the form of thin and light resilient strips, as herein illustrated, or may be of any other type compatible with the function ascribed to the said springs.

Having described my invention, what I claim and desire to secure by Letters-Patent, is:

1. A drag comprising body members hinged together and having pendent teeth throughout the area of their under sides, draft means connected with the forward ends of the said members, and springs carried by and extending laterally outward from the body members and adapted to displace insects from plants between which the drag is drawn.

2. A combined ground mulshing and insect destroying apparatus comprising teeth-carrying means, and springs connected with and extending laterally outward from said means and adapted to displace insects from the plants encountered thereby and precipitate the insects into the path of the teeth-carrying means.

In testimony whereof I affix my signature.

OLIVER H. ROSENBERG.